Jan. 13, 1931.  F. H. OWENS  1,789,112
OPTICAL PRINTER
Filed July 7, 1926
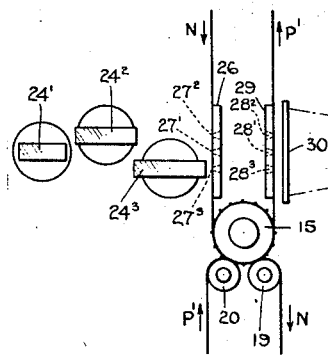
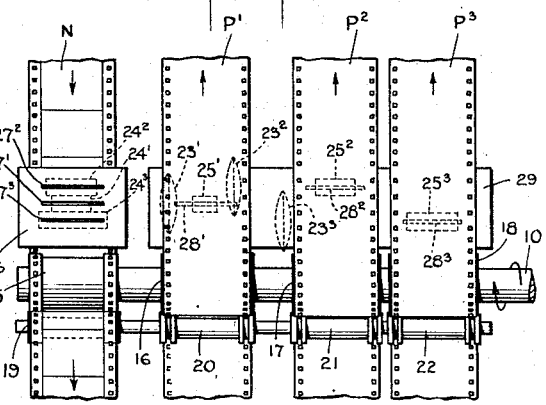
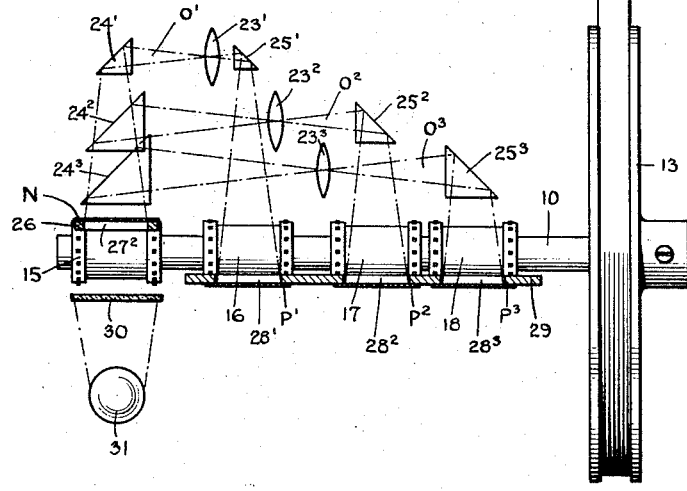
INVENTOR
Freeman H. Owens
BY
ATTORNEYS Patented Jan. 13, 1931

1,789,112

UNITED STATES PATENT OFFICE

FREEMAN H. OWENS, OF NEW YORK, N. Y.

OPTICAL PRINTER

Application filed July 7, 1926. Serial No. 120,982.

This invention relates to an optical printer, and has special reference to the provision of improvements in a system for optically printing positive film from negative film.

The prime desideratum of my present invention comprehends the provision of a method of and apparatus for optically printing film records such as motion picture records which is characterized by extreme simplicity of construction and mode of operation, the method and apparatus being readily adaptable for printing either one or a plurality of positive films from a negative film with equally simple apparatus.

In prior optical printing systems of which I am aware, the negative film is fed either intermittently or continuously by a film feeding device such as a sprocket past an exposure window and the images on the negative film are optically projected upon a positive film fed either intermittently or continuously by another film feeding device such as a sprocket past a second exposure window, the said sprockets being connected by gearing mechanism for operation in unison, and the optical system being located between the negative and positive film exposure windows.

In these prior systems the gearing connecting the film feeding devices presents the disadvantage of causing undesirable relative movements of the film feeding devices due to back lash, creepage or slippage of the connecting gearing, so that the positive film is not always capable of being run in exact correspondence with the negative film. Moreover, the gearing structure employed presents a relatively complex piece of mechanism for the service to be performed, and this, combined with the necessity of spacing the film feeding mechanism on opposite sides of the optical projecting means, results in the production of a comparatively bulky apparatus. These prior systems, moreover, are ill adapted for use in producing a plurality of positive films from a single negative film.

My present invention has for its prime object the provision of an improved optical printing system in which the foregoing disadvantages of prior systems are very effectively obviated. More specifically, the desideratum of my present invention comprises the provision of an optical system in which the film feeding devices for feeding both the negative and positive film are all spacedly mounted on a single rotor member or shaft, thus permitting the elimination of the undersirable intermediate gearing devices; the further provision of such a system in which the negative and positive film may be moved in opposite directions by means of a single rotor member or shaft; the still further provision of an optical system in which a plurality of positive films may be simultaneously produced from a single negative film; and the still further provision of an optical system of the character referred to in which all of the film feeding devices for the plurality of positive films and the negative film are all mounted on a single shaft for simultaneous operation.

To the accomplishment of the foregoing and such other objects as will hereinafter appear, my invention consists in the elements and their relation one to the other, as hereinafter more particularly described and sought to be defined in the claims; reference being had to the accompanying drawings which show the preferred embodiment of my invention, and in which:

Fig. 1 is a schematic side elevational view of my improved optical printing system, Fig. 2 is a front elevational view thereof, and Fig. 3 is a top cross-sectional view thereof.

Referring now more in detail to the drawings, the optical system of my invention comprises a single rotor member or shaft 10 operated either continuously or intermittently for feeding both the positive and negative film; the said shaft in the form of the invention exemplified in the drawings being shown continuously operated by means of a motor 11 connected to the shaft 10 by means of a pulley 12 on the motor shaft and a pulley balance wheel 13 fixed to the shaft 10, said pulley and pulley balance wheel being connected together by means of a belt 14.

The positive and negative film are fed by film feeding devices fixed to the rotor member or shaft 10 and in the construction exemplified in the drawings I show a plurality of film feeding devices for feeding a plurality of positive films so that a number of positives may be simultaneously produced from the negative film. The film feeding devices are preferably in the form of sprockets of standard design and comprise the sprocket 15 for feeding the negative film N and the plurality of sprockets 16, 17 and 18 spacedly arranged on the shaft 10 for feeding a plurality of positive films P', P² and P³. Where the film is fed continuously, the negative and positive film are fed in opposite directions as indicated by the arrows in Figs. 1 and 2 of the drawings, and to accomplish the desired result, the positive films P', P² and P³ are arranged on a side of the shaft opposite that on which the negative film N is arranged, whereby the rotation of the shaft 10 will move these films in the opposite directions. Cooperating with the film feeding sprockets for guiding the film as shown in Figs. 1 and 2 of the drawings, I provide the guide roll 19 cooperating with the negative film feeding sprocket 15 and guide rolls 20, 21 and 22 cooperating with the positive film feeding sprockets 16, 17 and 18.

For optically projecting the images from the negative to the positive film, I provide optical means for projecting and reflecting the images from the negative film to the positive film, and in the system exemplified in the drawings I show the adaptation of the system to the production of a plurality of positive films simultaneously by means of a plurality of optical systems. Referring more in detail to the drawings, it will be seen that I provide a plurality of optical systems generally designated as O', O² and O³ for the positives P', P² and P³ respectively, each optical system comprising a lens 23 designated with an exponent corresponding to the system with which it is related and a pair of reflectors in the form of prisms 24 and 25 designated with exponents corresponding to the optical system to which they are related.

All of the optical systems O', O² and O³ are arranged so as to project the negative image from a single picture area onto the positive films, and to accomplish this the reflecting prisms are made comparatively narrow in height, as clearly shown in the drawings. These reflecting prisms are associated with exposure frames comprising a negative exposure frame 26 having a plurality of exposure windows or slits 27', 27² and 27³, the exposure slit 27' being for the optical system O' and being related to an exposure slit 28' in the positvie frame device 29, the negative exposure slits 27² and 27³ being similarly related to exposure slits 28² and 28³ associated with the positive films P², P³. For illuminating images on the negative film, I may provide any suitable illuminating system, such as a diffusing ground glass 30 and a source of illumination 31. It will be noted that each optical system has a composite projection axis which is divided up into three parts, two components of the axis being generally perpendicular to and the remaining component of the axis being generally parallel to the axis of the shaft 10. The two perpendicular components serve to project the light to and from the film areas in a direction normal thereto, while the parallel axis component serves to transmit the projected beam from the negative to the positive along the direction of the axis of the rotor 10.

The use and operation of my improved optical printing system and the numerous advantages thereof will in the main be fully apparent from the above detailed description thereof. It will be further apparent that while I have shown and described the preferred form of my invention, that many changes and modifications may be made in the structure disclosed without departing from the spirit of the invention, defined in the following claims.

I claim:

1. A continuous optical printer comprising a rotor member, a plurality of separate film feeding devices arranged in axially spaced relation thereon, one film feeding device being operative for continuously feeding positive film and another film feeding device being operative for feeding negative film, and optical means associated with said film feeding devices arranged for projecting the images from the negative film to the positive film fed by said film feeding devices, said optical means having an optical axis component parallel to the axis of said rotor member.

2. A continuous optical printer comprising a rotor member, a plurality of separate film feeding devices arranged axially in spaced relation thereon for continuously feeding positive and negative film in opposite directions, one film feeding device being operative for feeding positive film and another film feeding device being operative for feeding negative film, film exposure windows on opposite sides of said film feeding devices, and optical means associated with said film feeding devices arranged for projecting the images from the negative film to the positive film fed by said film feeding devices.

3. An optical printer comprising a rotor member, a film feeding device for negative film and a plurality of film feeding devices for positive films all arranged in spaced relation on said rotor member, and optical means associated with said film feeding devices arranged for projecting the images from the negative film onto the plurality of positive films fed by said film feeding devices.

4. An optical printer comprising a shaft, a plurality of separate sprockets arranged axially in spaced relation on said shaft for feeding positive and negative film, one sprocket for feeding positive film and another sprocket for feeding negative film, and optical means associated with said sprockets arranged for projecting the images from the negative film to the positive film fed by said sprockets, said optical means having an optical axis component generally parallel to the axes of said sprockets.

5. A continuous optical printer comprising a shaft, a film feeding device on said shaft for continuously feeding negative film in one direction, a plurality of other film feeding devices on said shaft for continuously feeding a plurality of positive films in the opposite direction and optical means for projecting the images from the negative film simultaneously on to the positive films so fed.

6. A continuous optical printer comprising a shaft, a film feeding device on said shaft for continuously feeding negative film in one direction, a second film feeding device on said shaft for continuously feeding positive film in the opposite direction, film exposure windows on opposite sides of said shaft for said negative and positive film, and optical means for projecting and reflecting the images from the negative film to the positive film so fed, said optical means having an optical axis component parallel to the axis of said shaft.

Signed at New York city, in the county of New York and State of New York, this 24th day of June, A. D. 1926.

FREEMAN H. OWENS.